Patented Oct. 25, 1927.

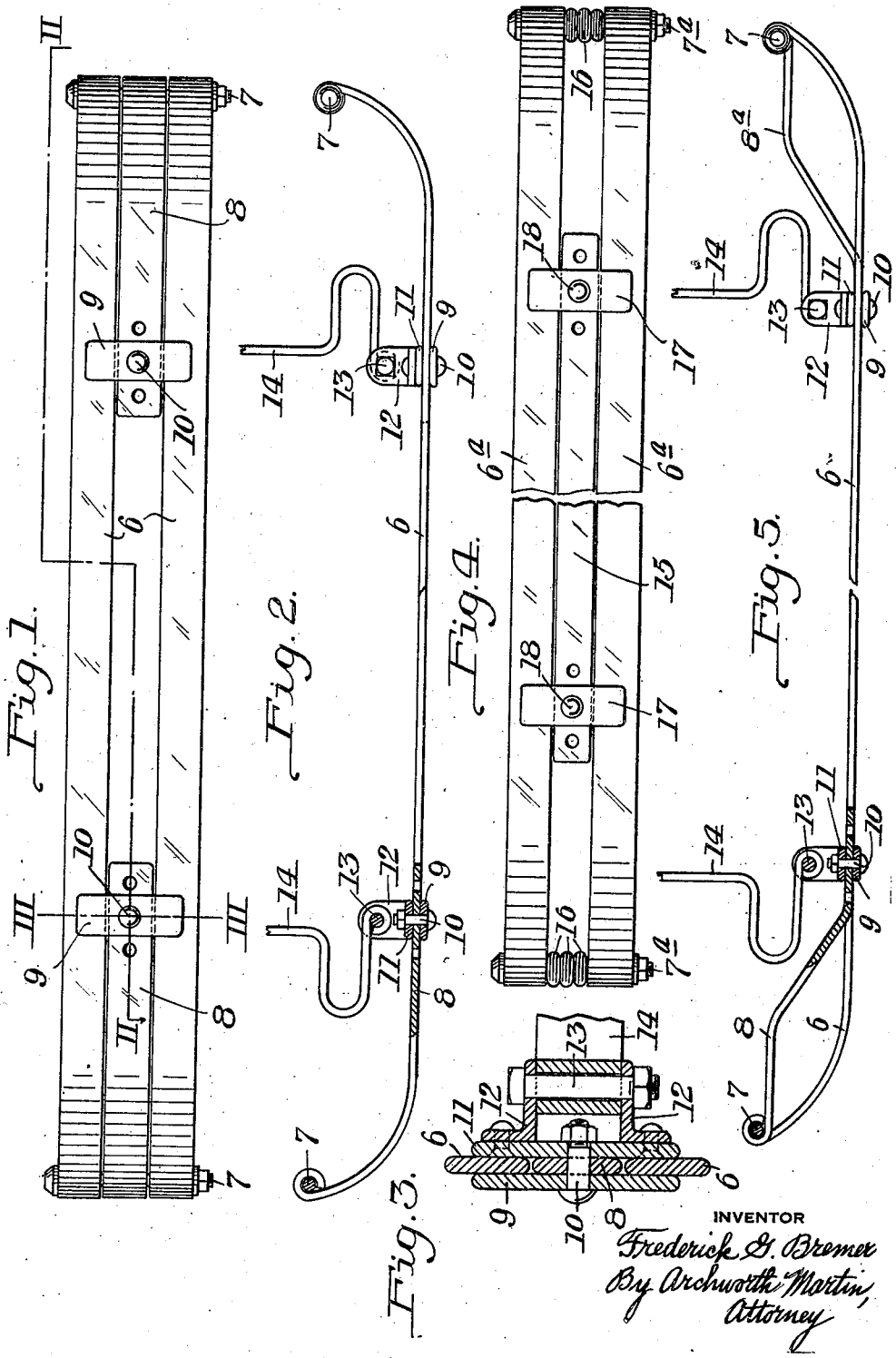

1,646,473

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

AUTOMOBILE BUMPER.

Application filed October 8, 1926, Serial No. 140,292. Renewed May 20, 1927.

My invention relates to impact members such as automobile bumpers, and the like.

One object of my invention is to provide, in combination with a bumper bar structure that is attached to a motor vehicle by fitting plates and brackets, means for preventing shifting of said plates relative to one another and relative to the bar.

Another object of my invention is to simplify and improve bumper structures generally.

Some of the forms which my invention may take are shown in the accompanying drawing, wherein Figure 1 is a front elevational view of one form of bumper structure; Fig. 2 is a view, taken on the line 2—2 of Fig. 1; Fig. 3 is a view taken on the line 3—3 of Fig. 1; Fig. 4 is a front elevational view of a modified form of bumper structure, and Fig. 5 is a view, partially in plan and partially in section, showing another modification.

The impact-receiving portion of the apparatus comprises two flexible bars 6, preferably of steel, that have eye-portions in their outer ends through which tie bolts 7 extend, to hold them in assembled relation. Intermediate or tie bars 8, preferably also of spring steel, have eye-portions in their outer ends, through which the bolts 7 extend. These bars 8 extend toward the mid portions of the bars 6 and are provided with a series of holes. Face plates 9 that may serve as name plates are clamped against the front faces of the bars 6 and 8, by bolts 10 that extend through such plates and the holes in the bars 8, and through a back plate 11, as shown more clearly in Fig. 3. A pair of angle plates 12 are riveted to each of the back plates 11 and are provided with perforations through which a bolt 13 extends. Bracket arms 14, the rear ends of which are secured to an automobile (not shown) in any suitable usual manner, have eye-portions that surround the bolts 13 so that a pivoted joint is formed between each bracket arm 14 and a pair of angle irons 12.

The intermediate bars 8 thus securely hold the face plates 9 in longitudinally rigid relation to the impact bars 6, thus preserving the symmetrical arrangement of the plates 9, and also maintaining the bumper bars 6 in symmetrical position with respect to the bracket arms 14, and hence symmetrical with respect to the vehicle to which the bracket arms are attached. The intermediate bars further exert a stiffening effect upon the outer ends of the bars 6 which are not only more often subjected to impacts than are the mid portions of the bars, but are less resistant to impacts.

If desired, the bars 8 may be bent rearwardly at their mid portions, as indicated at $8^a$ in Fig. 5, so that while such bars will still serve as sufficiently rigid tie members for the face plates 9 and their associated fittings, they will, nevertheless, be less conspicuous, because some users may object to the wide faces at the ends of the bars as having a cumbersome or weighty appearance. The structure of Fig. 5, will, in other respects, be substantially the same as shown in Figs. 1 to 3.

Referring now to Fig. 4, I show impact bars $6^a$ that are of the same form as the bars 6. In this arrangement, the bars 8 are eliminated and a single bar 15, at the mid portion of the bars $6^a$, is substituted therefor. The bars $6^a$ are held in assembled relation by tie bolts $7^a$, and spacer rings 16 are provided around the bolts $7^a$ and between the bars $6^a$. The intermediate bar 15 is connected to face plates 17 by bolts 18 that extend therethrough and through holes in the ends of the bar 15. Fittings corresponding to the members 11, 12, 13 and 14 of Figs. 1 to 3 will be provided for the bars $6^a$.

The various holes in the ends of the bars 8 and 15 are provided for the purpose of permitting adjustment to vehicles of various widths, since by changing the positions of the bolts 10 and 18 longitudinally of the intermediate bars, the arms 14 can be moved further apart and brought closer together, as desired. Or stated in other words, with the arms 14 attached to a vehicle, the various holes permit convenient attachment of the arms to the impact bars, at desired points longitudinally thereof.

It will be understood that other forms of fittings may be provided instead of the members 11, 12, 13, etc., and that the intermediate or tie bars may be of various other forms. For instance, the tie bar 15 may be deflected rearwardly at its mid portions as in the case of the tie bars $8^a$ of Fig. 5, to add to the appearance of lightness of the structure.

I claim as my invention:

1. Bumper structure, comprising a pair of vertically spaced parallel bars, plates at each side of the mid portion thereof, means for securing the plates to said bars and to a bumper support, and tie bars secured to said plates and the extremities of said bars, the tie bars being disposed in parallelism with the first named bars.

2. Bumper structure, comprising a pair of vertically spaced parallel bars, plates at each side of the mid portion thereof, means for securing the plates to said bars and to a bumper support, and tie bars secured to said plates and the extremities of said bars, the tie bars being disposed between and in parallelism with the first named bars.

3. Bumper structure, comprising a pair of vertically spaced parallel bars, plates at each side of the mid portions of said bars, means for securing the plates to said bars and to a bumper support, and means disposed entirely between said bars for rigidly holding said plates in predetermined relative positions.

4. Bumper structure, comprising a pair of vertically spaced parallel bars, plates at each side of the mid portion thereof, means for securing the plates to said bars and to a bumper and support, and means disposed entirely between said bars for holding said plates against movement longitudinally of the bar.

5. Bumper structure, comprising a pair of vertically spaced parallel bars, having eye portions at their ends, attaching plates between the mid portion and each end thereof, and intermediate bars disposed entirely between the first named bars, and having eye portions in the outer ends thereof, and each connected at its inner end to one of the said plates, and tie bolts extending through adjacent eye portions of the various bars.

6. Bumper structure, comprising an impact-receiving bar, an attaching plate between the mid portion and each end thereof, tie bars connected at their outer ends to said bar, and means for connecting each of said plates to the inner end of one of said tie bars, at various points longitudinally thereof.

7. Bumper structure, comprising an impact-receiving plate between the mid portion and each end thereof, tie bars connected at their outer ends to said bar, and means for connecting each of said plates to the inner end of one of said tie bars at various points longitudinally thereof, said means comprising a plurality of longitudinally spaced holes in the tie bars and bolts extending through the plates and holes in said tie bars.

8. Bumper structure, comprising an impact-receiving bar, an attaching plate connected to said bar intermediate the ends thereof, a tie bar extending in the same general direction as the first named bar, means adjustable in a direction longitudinally of said bars, for connecting one end of the tie bar to said plate, and means for connecting the other end of said tie bar to the first named bar.

9. The combination with a pair of bumper supporting arms, of a pair of vertically-spaced parallel bars, a plate at each side of the mid portion of the bars, means for securing the plates to said bars, means for securing the plates to said supporting arms, and tie bars having interlocking connections with said plates and to the ends of said parallel bars.

10. The combination with a pair of bumper supporting arms, of a pair of vertically-spaced parallel bars, a plate at each side of the mid portion of the bars, means for securing the plates to said bars, means for securing the plates to said supporting arms, a tension member, and interlocking connections between said member and each of said plates and the parallel bars, for holding said plates in predetermined relative positions.

11. The combination with a pair of bumper supporting arms, of a pair of vertically-spaced parallel bars, a pair of clamping plates at each side of the mid portion of the said bars, means for clamping the plates to said bars, means for securing the plates to the supporting arms, and a tension device interlocked with each pair of plates and the said parallel bars, for holding said plates in predetermined relative positions.

In testimony whereof, I, the said FREDERICK G. BREMER, have hereunto set my hand.

FREDERICK G. BREMER.